United States Patent
Oh

(10) Patent No.: US 7,770,166 B2
(45) Date of Patent: Aug. 3, 2010

(54) FORCIBLY DOWNLOADING PROGRAM IN MOBILE COMMUNICATIONS TERMINAL

(75) Inventor: Hyung-Suk Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 1222 days.

(21) Appl. No.: 11/210,018

(22) Filed: Aug. 22, 2005

(65) Prior Publication Data

US 2006/0048146 A1    Mar. 2, 2006

(30) Foreign Application Priority Data

Aug. 24, 2004 (KR) ............ 10-2004-0066867
Aug. 24, 2004 (KR) ............ 10-2004-0066869

(51) Int. Cl.
*G06F 9/445* (2006.01)
*G06F 9/45* (2006.01)

(52) U.S. Cl. ........................... 717/174

(58) Field of Classification Search ......... 717/173–178; 709/203–204
See application file for complete search history.

(56) References Cited

U.S. PATENT DOCUMENTS

| | | | | |
|---|---|---|---|---|
| 6,122,671 | A * | 9/2000 | Farrar et al. ............ | 709/238 |
| 6,256,664 | B1 * | 7/2001 | Donoho et al. ........... | 709/204 |
| 6,295,645 | B1 * | 9/2001 | Brewer .................... | 717/178 |
| 6,343,312 | B1 * | 1/2002 | Yokote .................... | 709/203 |
| 6,496,979 | B1 * | 12/2002 | Chen et al. ................ | 717/178 |
| 6,604,237 | B1 * | 8/2003 | Giammaria ............... | 717/174 |
| 6,976,253 | B1 * | 12/2005 | Wierman et al. .......... | 717/177 |
| 7,117,494 | B2 * | 10/2006 | Rajaram ................... | 717/174 |
| 7,143,405 | B2 * | 11/2006 | Liu et al. .................. | 717/173 |
| 7,254,811 | B2 * | 8/2007 | Kouznetsov et al. ....... | 717/173 |
| 7,350,205 | B2 * | 3/2008 | Ji ............................. | 717/172 |
| 7,373,377 | B2 * | 5/2008 | Altieri ..................... | 709/203 |
| 7,392,522 | B2 * | 6/2008 | Murray et al. ............ | 717/174 |
| 7,461,372 | B2 * | 12/2008 | Lilley ....................... | 717/168 |
| 7,478,386 | B2 * | 1/2009 | Dietrich et al. ........... | 717/175 |
| 7,480,907 | B1 * | 1/2009 | Marolia et al. ............ | 717/174 |
| 7,546,389 | B2 * | 6/2009 | Kouda ..................... | 710/16 |
| 7,603,667 | B2 * | 10/2009 | Lee et al. .................. | 717/172 |
| 2002/0090946 | A1 | 7/2002 | Mielke et al. | |
| 2004/0034805 | A1 | 2/2004 | Chuang et al. | |
| 2004/0068721 | A1 | 4/2004 | O'Neill et al. | |

FOREIGN PATENT DOCUMENTS

KR    1020010017586    3/2001

(Continued)

OTHER PUBLICATIONS

Blazer et al, "Application downloading", IEEE, pp. 450-459, 1981.*

(Continued)

*Primary Examiner*—Anil Khatri
(74) *Attorney, Agent, or Firm*—Lee, Hong, Degerman, Kang & Waimey

(57) ABSTRACT

The present invention relates to forcibly downloading a program in a mobile communications terminal. Preferably, a memory of the terminal is divided into a boot binary region and a main binary region. A boot program and a main program of a binary program are then downloaded to the boot binary region and the main binary region, respectively. Whether the downloading of the binary program is successful or not is then recorded in a particular address of the memory. After, it is determined whether to enter a forcible download mode by checking a value of the particular address.

25 Claims, 6 Drawing Sheets

FOREIGN PATENT DOCUMENTS

| | | |
|---|---|---|
| KR | 1020010073533 | 8/2001 |
| KR | 1020020080186 | 10/2002 |
| KR | 1020040079113 | 9/2004 |
| WO | WO 01/09722 A1 | 2/2001 |
| WO | WO 03/025742 A2 | 3/2003 |
| WO | WO 2004/114101 A | 12/2004 |

OTHER PUBLICATIONS

Ahem et al, "Formalising Java RMI with explicit code mobility", ACM OOPSLA, pp. 403-422, 2005.*

Hu et al, "Mobile server: an efficient mobile computing platform based on mobile agent", IEEE, pp. 1339-1342, 2005.*

Popa et al, "Using code collection to support large applications on mobile devices", ACM Mobicom, pp. 16-29, 2004.*

Hesselman et al, "Delivering live multimedia streams to mobile hosts in a wireless internet with multiple content aggregators", ACM, Mobile networks and applications 10, pp. 327-339, 2005.*

Moshchuk et al, "Flashproxy: transparently enabling rich web content via remote execuation", ACM MobiSys, pp. 81-93, 2008.*

* cited by examiner

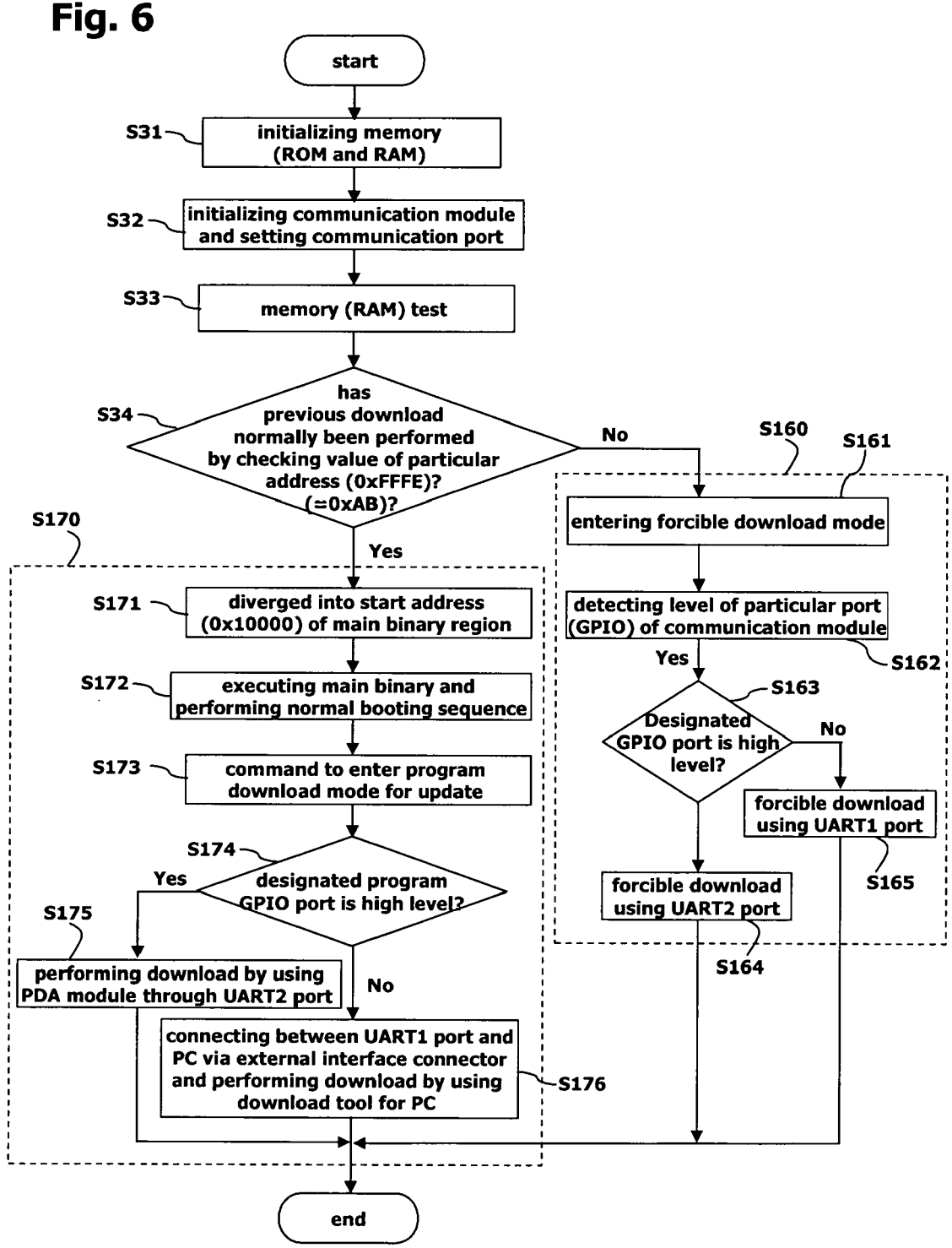

FORCIBLY DOWNLOADING PROGRAM IN MOBILE COMMUNICATIONS TERMINAL

CROSS-REFERENCE TO RELATED APPLICATIONS

Pursuant to 35 U.S.C. §119(a), this application claims the benefit of earlier filing date and right of priority to Korean Application No. 2004-66867, filed on Aug. 24, 2004 and Korean Application No. 2004-66869, filed on Aug. 24, 2004, the contents of which are hereby incorporated by reference herein in their entirety.

FIELD OF THE INVENTION

The present invention relates to forcibly downloading a program in a mobile communications terminal, and more particularly, to a method and apparatus for forcibly downloading a program by generating a boot binary in a PDA integrated mobile communications terminal.

BACKGROUND OF THE INVENTION

In general, mobile communications terminals (hereinafter, referred to as "terminals") have firmware programs loaded therein when manufactured. When a terminal sold in the marketplace malfunctions, or the program loaded in the terminal is to be updated, the firmware program must be downloaded into the terminal again at a service center.

However, when power of the terminal is off while downloading (updating) the program or a PC (personal computer) is shut down, the downloading (updating) of the program may fail. Consequently, because the downloading process has not been completed, normal booting of the terminal is impossible.

Accordingly, if the above-described situation occurs, the terminal has a unit for allowing the terminal to enter a forcible download mode by pressing a designated particular key (button). However, in case of a personal digital assistant (PDA) integrated terminal, also called a "PDA phone", key scan is not performed in a communication module (e.g., a CDMA module or MSM) itself. Rather, a result value obtained by the key scan in a PDA module is transmitted to the communication module via a predetermined communication port, called "UART2". Thus, the above-described forcible download mode switching method cannot be applied to the PDA phone.

As illustrated in FIG. 1, the PDA integrated terminal has a PDA module for performing a PDA function and a communication module for performing a mobile phone function, which are separated from each other to perform the different functions and roles. A control packet is transmitted and received between the PDA module and the communication module through a communication port (UART2). The communication module is also connected to another communication port (UART1) in order to download a binary program through an external interface connector. However, when a mode of the terminal must be switched to a forcible download mode, such as when it is impossible to normally boot the terminal, a key scan, wherein a key on a keypad of a general terminal is pressed, is not recognized in the communication module itself. However, the key scan is recognized in the PDA module and a value of such a result is transmitted to the communication module through a predetermined communication port, such as the UART2.

Accordingly, the PDA integrated terminal can recognize the key operation being transmitted from the PDA module when a certain task for serial communications with the PDA is smoothly performed after the communication module is normally booted. However, if the binary program is being downloaded to the communication module and the downloading process is not successfully completed, the communication module cannot be normally booted. Thus, communication between the PDA module and the communication module are not performed. Accordingly, even though the user intends the terminal to enter the forcible download mode by pressing a particular key (button) as in a related method, the PDA integrated terminal cannot recognize the key operation and therefore the related method cannot be applied.

In addition, the PDA integrated terminal is designed such that the binary download can be supported through all communication ports (e.g., UART1 and UART2). In particular, the UART1 is used for mass production, and the UART2 is used when the user is linked to an Internet site of the manufacturer, downloads a binary file and directly performs an update.

More specifically, the UART1 is used for binary download for mass production of terminals, RF (Radio Frequency) calibration, Cait and DM (Diagnostic Monitoring), Script, and PRL Read & Write. The UART2 is used to transmit and receive a control packet between a PDA module and a CDMA module or for the user to connect to the Internet site of the manufacturer, download the binary file to the PC, and perform an on-line update function by copying the binary file to the PDA connected via USB (Universal Serial Bus). In the related art, the forcible download is performed with a particular port (UART1). However, when the forcible download function is performed by the UART1 port, an interface connector especially manufactured by the manufacturer, such as a 24-pin connector named LT, is required for mass production. Accordingly, when the user attempts to update the binary program himself or herself, and the update fails because of various problems, the forcible download function cannot be performed without the interface connector.

SUMMARY OF THE INVENTION

The present invention is directed to forcibly downloading a program in a mobile communications terminal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for forcible downloading at a mobile communications terminal, including dividing a memory of the terminal into a boot binary region and a main binary region, downloading a binary program to be updated to the memory, recording in a particular address of the memory whether the downloading of the binary program is successful, and determining whether to enter a download mode according to whether an error has occurred by checking a value of the particular address Of the boot region when booting the terminal.

Preferably, the terminal is a personal digital assistant (PDA) having a mobile phone function. The boot binary region including a function related to a booting sequence.

In one aspect of the invention, the boot binary region includes an initialization driving algorithm, a program related to initialization of RAM and ROM, a program related to initialization of a communication port, and a function for allowing to set a continuous, particular data Baud rate.

In another aspect of the invention, the boot binary region includes a corresponding driver for allowing the download of a program through a communication port for the transmission and reception of data between a communication module and a PDA module.

Preferably, the communication port is UART2. The main binary region includes functions except for a function related to a booting sequence.

In the dividing step, the binary region is obtained by dividing the memory of the terminal. In the recording step, the particular address is located in the boot binary region. In the recording step, a value being recorded in the particular address when the binary program is successfully downloaded to the terminal is different from a value being recorded in the particular address when the binary program is not successfully downloaded to the terminal.

In the determining step, the terminal enters the forcible download mode if the value of the particular address is read and corresponds to a case where the binary program is incompletely downloaded. In the determining step, normal booting is performed if the value of the particular address is read and corresponds to a case where the binary programs is successfully downloaded.

In a further aspect of the invention, the method further includes selecting a communication port through which the binary program is downloaded when the terminal enters the program forcible download mode and downloading the program through the selected communication port.

In the selecting step, the communication port is selected by retrieving a value of a particular port of the communication module inside the terminal. Preferably, the value of the particular port is determined by a user switch operation.

In the selecting step, the communication port includes a communication port for the transmission and reception of data between a PDA module and a communication module. In the selecting step, the communication port includes a communication port connected to a PC by using an external interface connector such that the binary program may be downloaded.

In the downloading step, after the program is downloaded to a PDA module by connecting the terminal to a PC without a separate external interface connector, the program is downloaded again through the communication port for performing communication between the PDA module and a communication module.

In another embodiment of the present invention, a method for forcible downloading at a mobile communications terminal when a program is downloaded to the mobile communications terminal includes dividing a memory into a boot binary region and a main binary region and implementing a merge program for merging the binaries, downloading a predetermined binary program to the terminal, and recording a predetermined value in a particular address of the memory according to whether or not the downloading is successful.

The method further includes entering a forcible download mode if the value of the particular address is read when the terminal is rebooted and corresponds to a case where the binary program is incompletely downloaded.

Preferably, the particular address is located in the boot binary region. The value recorded in the particular address is read whenever power is supplied to the terminal and the terminal is booted.

In another embodiment of the present invention, a method for forcible downloading at a mobile communication terminal when an update program is downloaded to the terminal, includes separating a boot program from the program, downloading the separated boot program to a boot binary region of a memory, and recording whether the downloading is successful or not in a particular address of the boot binary region.

When power is supplied to the terminal, the terminal is booted by the boot program stored in the boot binary region. When the terminal is booted, a value in the particular address is read and the terminal enters a forcible download mode in order to download the program again according to the read value.

Preferably, the boot program checks whether the program is normally updated or not whenever the terminal is booted. The boot program includes a function for allowing a mode of the terminal to be switched to a forcible download mode when it is determined that it is difficult to operate the terminal because of an incomplete program update.

In another embodiment of the present invention, a method for forcible downloading at a mobile communications terminal when the mobile communications terminal enters a forcible download mode, includes downloading the program to a communication module again through a communication port selected by a user after the program is downloaded to a PDA module from a PC.

If a user sets a communication port through which the program is downloaded by a switch provided on the terminal, a port by which the program is forcibly downloaded is determined according to a level value of a particular port of the communication module.

In another embodiment of the present invention, an apparatus for forcible downloading at a mobile communications terminal, includes a memory divided into a boot binary region where a booting program for performing a booting sequence is stored and a main binary region, the boot binary region including a particular address in which information regarding whether a previous update of the program has been successful or not is recorded whenever the terminal is booted and a switch for selecting a communication port through which a program is downloaded when the mobile communications terminal enters a program forcible download mode.

Preferably, the switch is a pull down-pull up switch, in which the switch determines a level value of a particular port of the communication module. Preferably, the particular port is GPIO (General Purpose Input and Output).

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 6 is a flowchart illustrating a process for performing a program forcible download by selecting a communication port in accordance with one embodiment of the present invention.

DETAILED DESCRIPTION OF THE PREFERRED EMBODIMENTS

Figure 1:
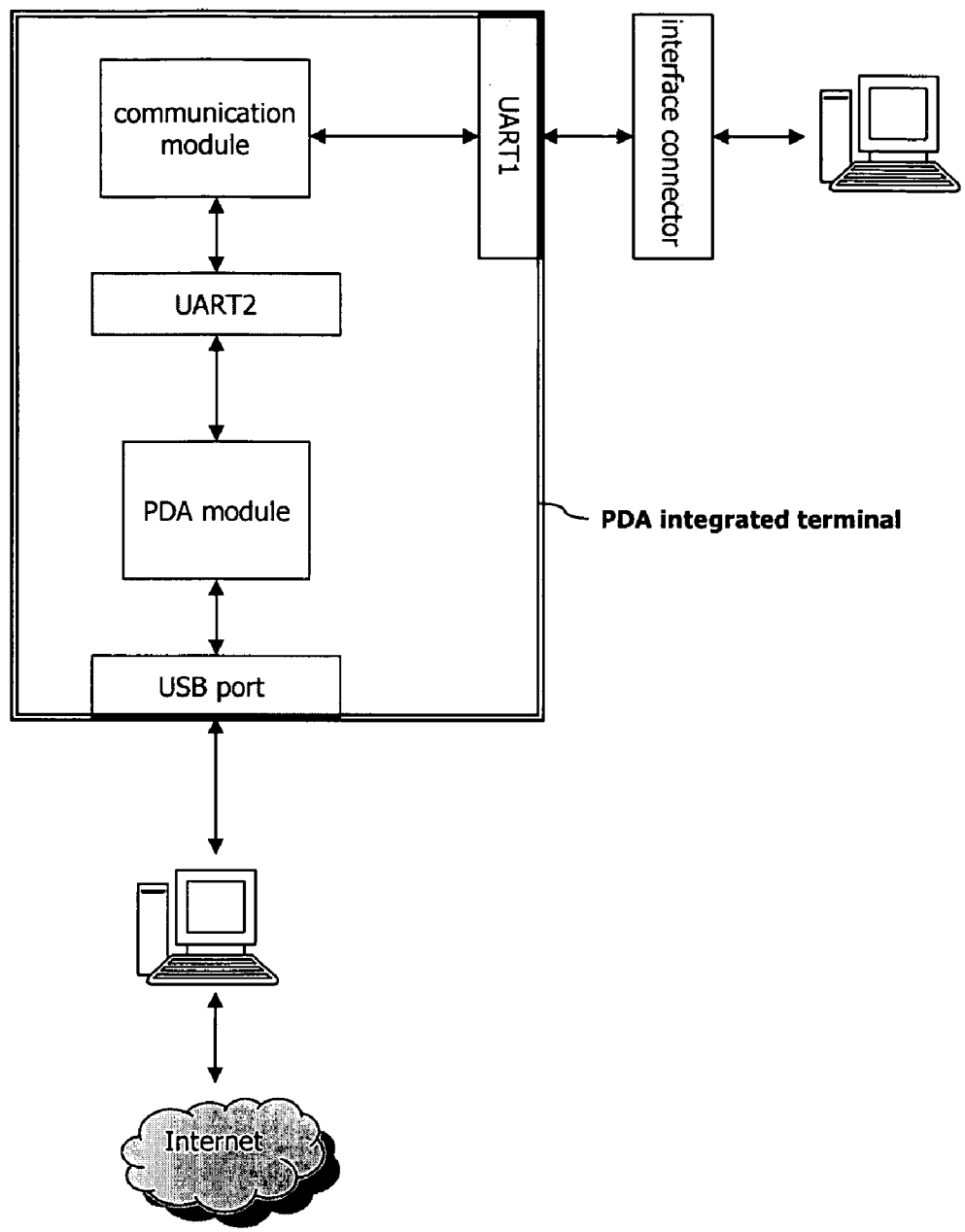
FIG. 1 is a schematic construction view of a general PDA integrated communications terminal.

The present invention relates to forcibly downloading a program in a mobile communications terminal.

Reference will now be made in detail to the preferred embodiments of the present invention, examples of which are illustrated in the accompanying drawings.

The present invention is implemented in PDA integrated mobile communications terminals, also known as PDA phones. However, the present invention may be applied to communication terminals operating according to another specification.

In accordance with one embodiment of the present invention, a method is provided for automatically varying a mode of a mobile communications terminal (hereinafter referred to as a "terminal") to forcibly download a program if it is determined that the terminal is having difficulty operating as a result of incompletely or abnormally updating the program after checking whether the latest program update has been normally or completely performed. A boot program reads a value of a particular address whenever the terminal is booted by dividing a memory region of the terminal into a boot binary region and a main binary region and by storing a corresponding binary program in each region, in which the program is downloaded by UART2 as well as UART1 when the terminal enters the forcible download mode. Hereinafter, preferred embodiments of the present invention will be described with reference to the accompanying drawings. Parts having the same reference numerals have the same operations and functions.

Figure 2:
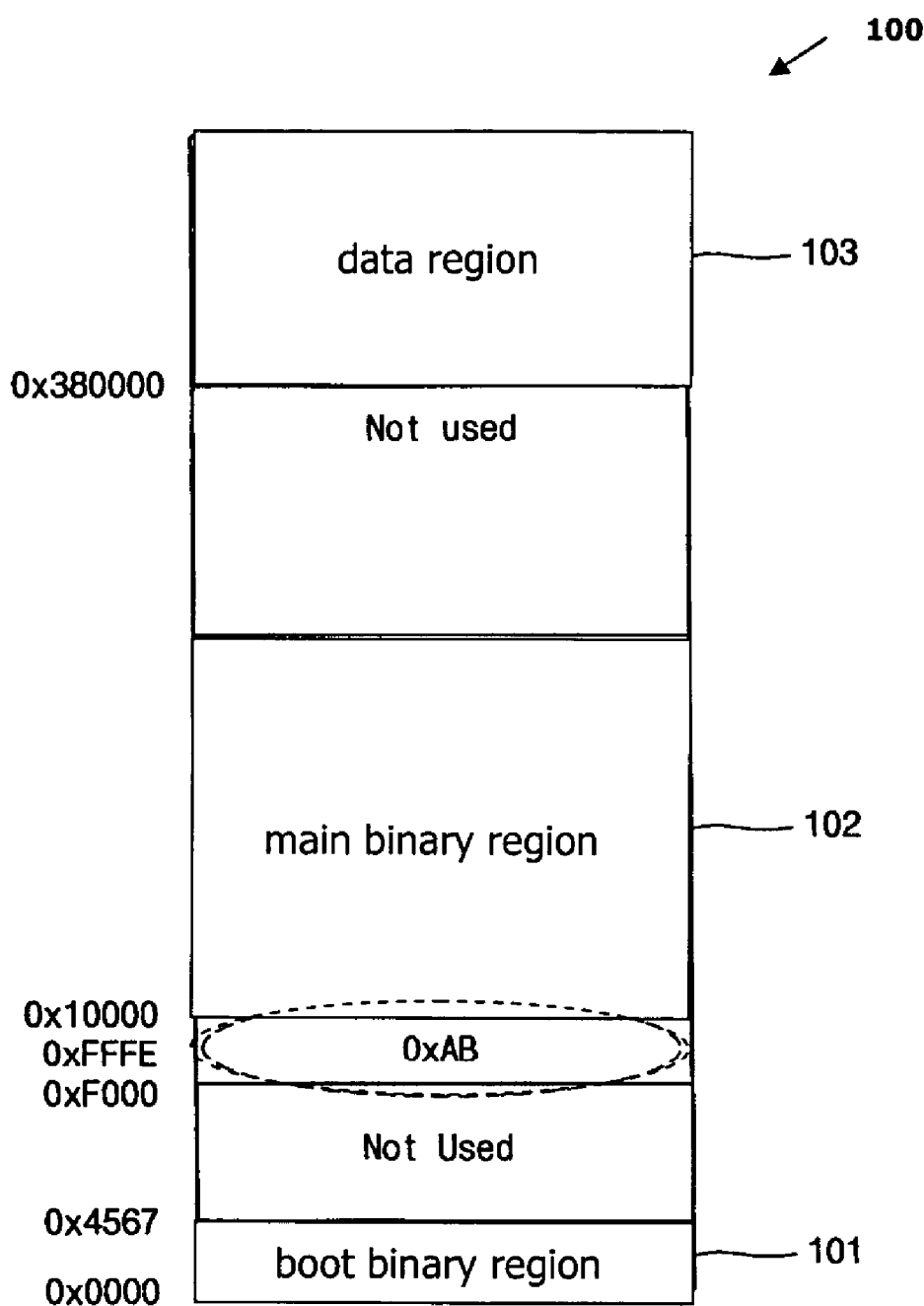
FIG. 2 is an exemplary view illustrating a map configuration of a program memory of the mobile communications terminal in accordance with one embodiment of the present invention.

FIG. 2 is an exemplary view illustrating a map configuration of a program memory of a mobile communications terminal in accordance with one embodiment of the present invention. In the related art, one binary region is constructed such that a main program including a booting program is stored from a 0 address (0x000) and data is stored in a certain region from and end address. However, in the present invention, as illustrated in FIG. 2, a boot binary region 101 is separated from a main binary region 102, wherein a boot program is stored in a certain region (boot binary region) from the 0 address (0x000) and a main program is stored in the main binary region set from a predetermined address (0x10000).

Here, the boot program being stored in the boot binary region relates to a booting sequence, including an initial driving algorithm of a communication module (e.g., an MSM chip), programs related to initializations of RAM and ROM and of a communication port (e.g., UART), and a function for allowing the continuous downloading of one or more programs at a predetermined data Baud rate. Preferably, a related program (e.g., a driver of UART2) or function for allowing a download through a second communication port (UART2) as well as a first communication port (UART1) is further included in the boot binary region 101. The main program being stored in the main binary region includes functions related to the operation of the terminal except for functions related to the booting sequence.

Thus, a merge program is required to store the boot program and the main program in corresponding regions, respectively, by separating the boot binary region from the main binary region. That is because one binary program is originally generated when a program targeted to be downloaded is complied in the terminal. Accordingly, the merge program merges the boot program and the main program such that one executable program is finally operated. By designating separated memory regions (e.g., a boot binary region and a main binary region), corresponding programs (the boot program and the main program) are stored in respective regions.

In addition to the functions related to the terminal booting sequence, the boot program includes a function for automatically varying the mode of the terminal into the forcible download mode when it is determined that the terminal is having difficulty operating as a result of incompletely or abnormally updating a program by checking whether or not the program has been normally or completely (with no error or interrupt) performed whenever the terminal is booted.

Preferably, whether or not the program has been normally updated is checked in such a manner that a predetermined status value (normal status value:0xAB and error status value: 0x FF or 0x00) is recorded in a particular memory address (0xFFFE) according to whether normal update has been completed or not when a program is updated. When the terminal is booted, it is continuously booted if the normal status value (0xAB) is recorded by checking a value of the corresponding address. If the error status value (0xFF or 0x00) is recorded, the mode of the terminal is switched to the forcible download mode.

If no problem occurs when updating the program, the booting is normally completed since the boot program and the main program are combined into one by the merge function. Accordingly, there is no problem generated hereafter with respect to the operation of the terminal or updating a program.

A region 103, as shown in FIG. 2, is a readable/writeable data region, and is used to store telephone book data and the like.

Figure 3:
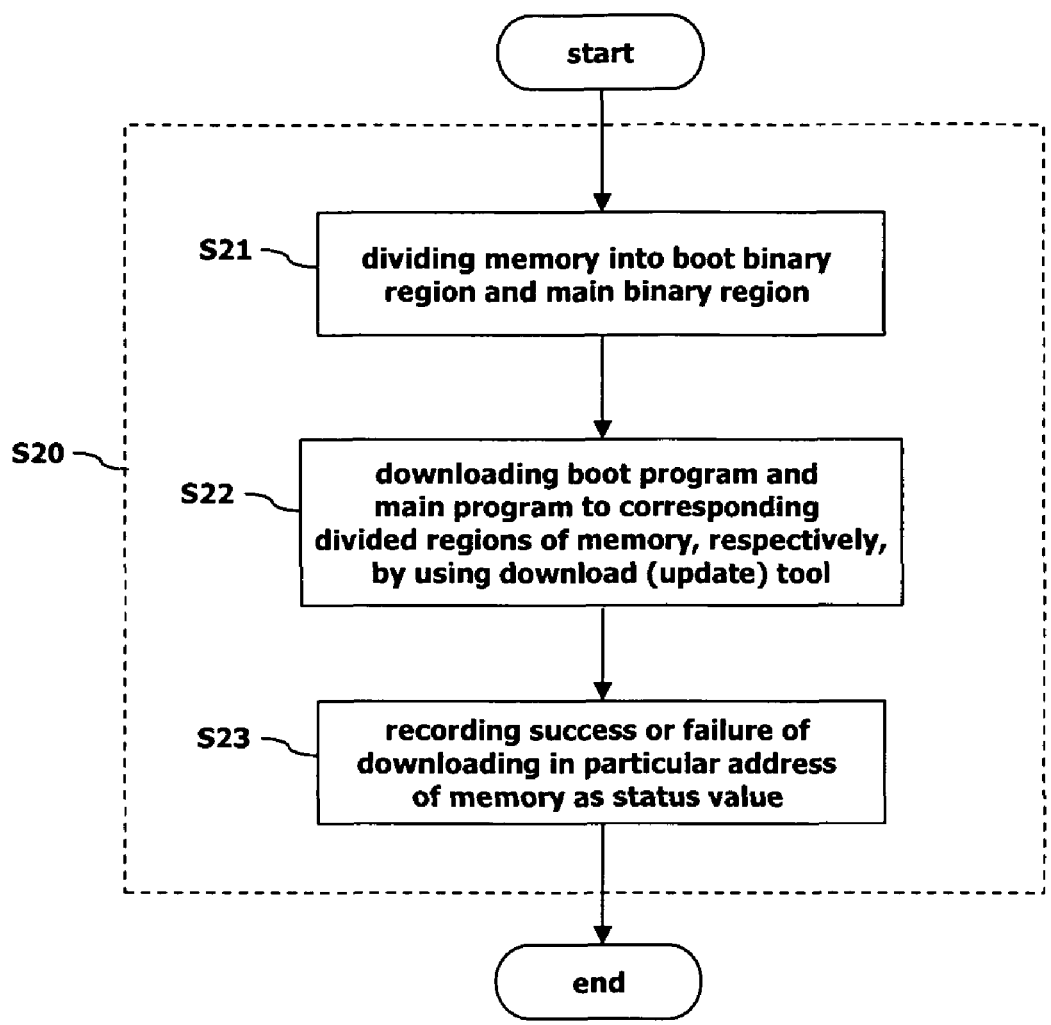
FIG. 3 is a flowchart illustrating a downloading process for updating a program in the mobile communications terminal in accordance with one embodiment of the present invention.

FIG. 3 is a flowchart illustrating implementation of a downloading process to update a program in the mobile communications terminal in accordance with one embodiment of the present invention.

With reference to FIG. 3, after the terminal is connected to a PC by plugging a communication port cable to a communication port (UART) of the terminal, a program is updated using a download (update) tool provided in the PC. Preferably, in order for an update program to be downloaded so that it is divided into the boot program and the main program, a boot binary region and a main binary region are set in a memory using the download (update) tool (S21). Here, the boot binary region includes a first area from a 0x000 address to a 0xFFF address and the main binary region includes a second area after a 0x10000 address.

Next, the boot program and the main program are downloaded and stored in the corresponding regions, respectively (S22). Preferably, the boot program includes functions and variables required to perform initializations of a communication module, RAM, ROM, a communication port (UART) and the like of the mobile communication terminal. A program except for a boot sequence is included in the main program. Here, the boot program and the main program, which are separated from each other and stored in the memory, are merged by the merge program to operate as one integrated binary program.

Next, in the step S22, the download (update) tool checks whether the downloading is normally successful or failed and records the downloading state in a particular address of the boot binary region (S23). That is, if the downloading is normally completed, a particular status value (e.g., 0xAB) of the memory is recorded in a particular address (e.g., 0xFFFE address) of the memory. However, when a downloading process is stopped or abnormally performed (i.e., the download fails) because of a certain interrupt or an error during communication while downloading the program, an error status value (e.g., 0xFF or 0x00) is recorded in a particular address (e.g., a 0xFFFE address). Accordingly, checking the value of the particular address can check success or failure of the update program downloading. If power is supplied to the terminal after updating the program according to the process in FIG. 3, the terminal is booted according to the booting sequence and then the updated program is executed.

Figure 4:
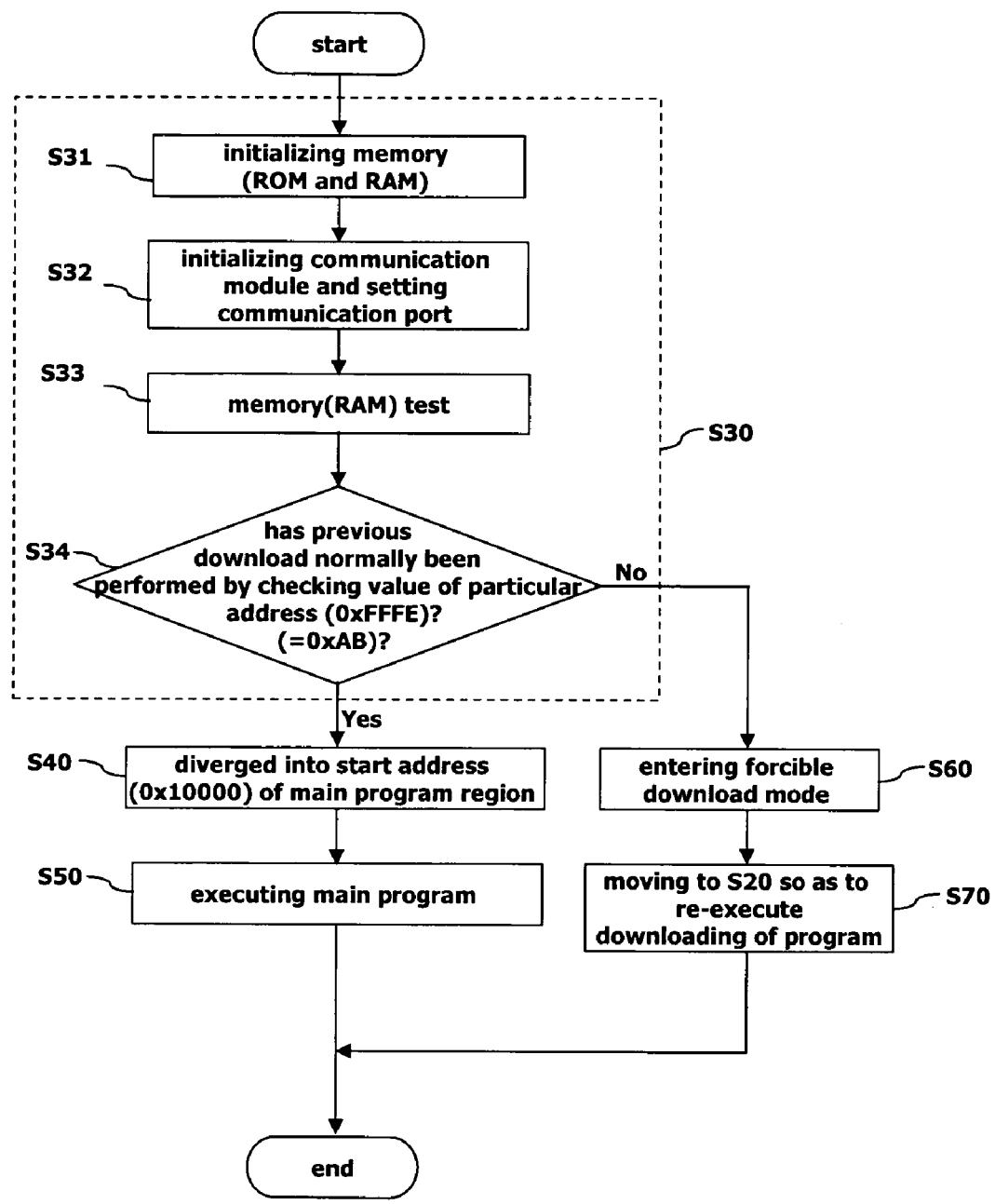
FIG. 4 is a flowchart illustrating a booting process in the mobile communications terminal in accordance with one embodiment of the present invention.

FIG. 4 is a flowchart illustrating a booting process of the mobile communications terminal in accordance with one embodiment of the present invention. With reference to FIG. 4, when power is supplied to the terminal, the booting program initializes hardware according to a booting sequence (S30). First, a memory (RAM and ROM) is initialized (S31). A communication port is then set by initializing a communication module and changing a Mux setting (e.g., setting a GPIO port of the communication module, setting a system clock or the like) (S32). After, a memory (RAM) test process is performed (S33).

The H/W (hardware) initialization processes (S31 to S33) must be performed to operate the terminal or for the terminal to enter the forcible download mode. After all the processes (S31 to S33) are performed, it is checked whether the latest program update has been normally completed (S34). Accordingly, the boot program reads a value of a particular address (e.g., a 0xFFFE address), and determines according to the status value whether to perform booting according to a normal boot sequence process or to execute downloading (updating) of the program again by entering the forcible download mode (S34).

Preferably, by checking a predetermined status value recorded in the particular memory address (0xFFFE) (S34), if the normal status value (0xAB) has been recorded, it is diverged into the address (0x10000) where the main program is stored and booting continues (S40 and S50). If the error status value (0xFF or 0x00) has been recorded, a mode of the terminal is switched to the forcible download mode (S60).

When the terminal enters the above-described process (i.e., S60), the terminal must re-download the program abnormally downloaded previously. Preferably, the terminal moves to the program updating process S20 illustrated in FIG. 3 to re-execute downloading of the program (S70).

Accordingly, after the terminal enters the program forcible download mode, the user selects a communication port and can download the program. Hereinafter, an operation for performing the program download (or update) by selecting a communication port will be described.

Figure 5:
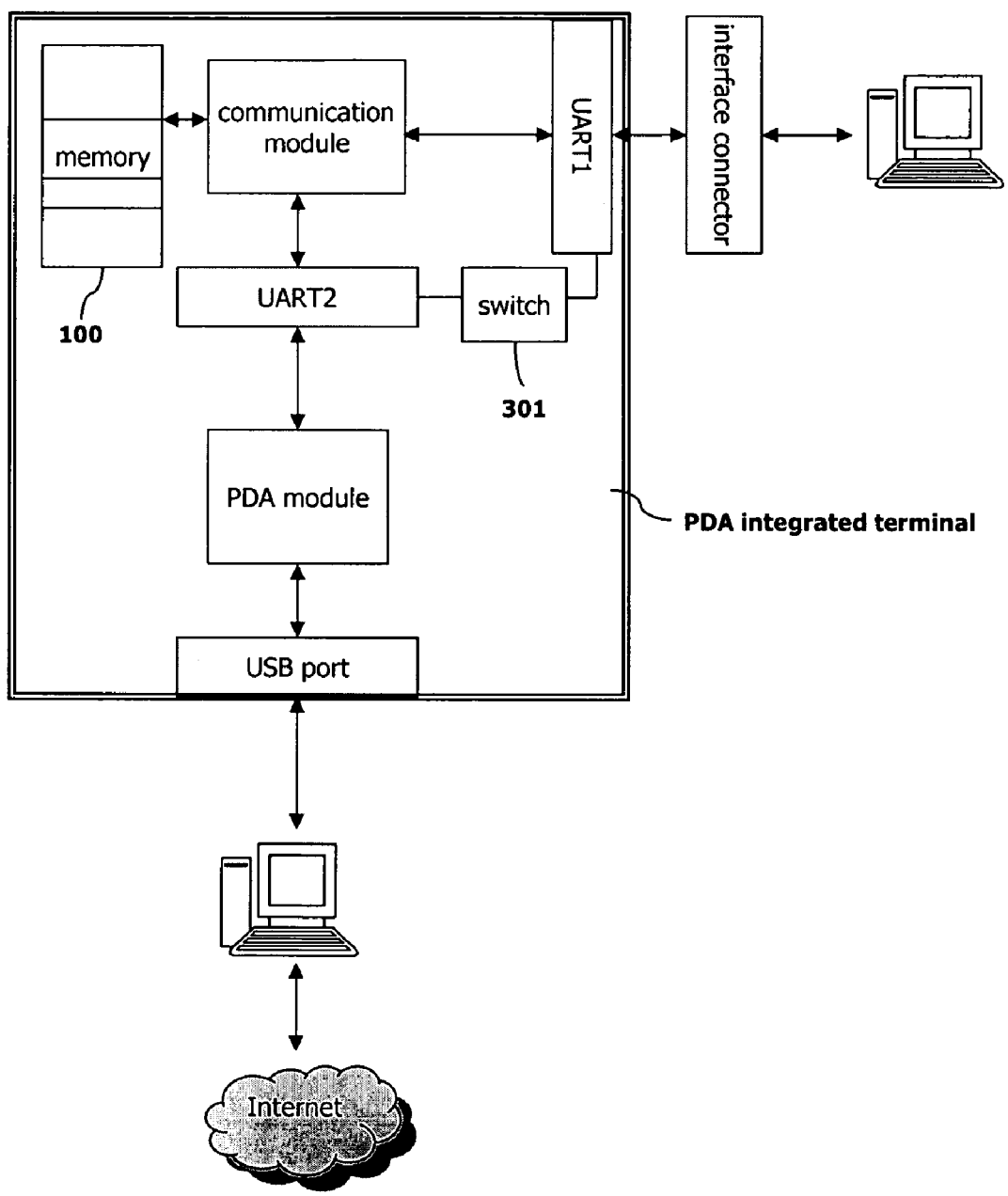
FIG. 5 is a schematic construction view of a mobile communications terminal for selecting a communication port and implementing a program forcible download in accordance with one embodiment of the present invention.

FIG. 5 is a schematic construction view of a mobile communications terminal for selecting a communication port and implementing a program forcible download in accordance with one embodiment of the present invention. As illustrated, the terminal in accordance with the present invention includes a memory 100 for performing the functions illustrated in FIG. 2 and a switch 301 for allowing the user to select a communication port (e.g., UART1 or UART2) through which a program is downloaded. FIG. 6 is a flowchart illustrating a process for performing a program forcible download by selecting a communication port in accordance with one embodiment of the present invention.

With reference to FIGS. 5 and 6, the user connects to an Internet site of the terminal manufacturer, downloads a cabinet file of a specific terminal model the user has to his or her own PC, copies the cabinet file to a PDA module by using an application program tool (e.g., an active Sync) or a memory card, and executes the cabinet file to perform a binary update of a communication module (CDMA module). Here, the cabinet file is a file in which a program file (binary file) to be updated and a tool (application program) to be used for program update are bound into one.

If power of the PDA is off, a battery of the PDA is separated from a main body by a user's mistake, or unavoidable impediments in communication occur while updating the program, the PDA is reset. Therefore, power being supplied to the communication module is turned off and then turned on again to perform a reboot.

As described, if the communication module (e.g., a CDMA module or an MSM chip) is rebooted, the memory (RAM and ROM) is initialized to perform normal operation (S31). A communication port is then set (e.g., GPIO port setting of the communication module, system clock setting or the like) by initializing the communication module (e.g., initialization of H/W register values of an MSM chip) and changing a Mux setting (S32). After, a memory (RAM) test process is performed (S33).

When all the H/W initialization processes are finished (S31 to S33), it is checked whether the previous program updating process has been appropriately performed or not by reading a value of a particular address (0xFFFE) of a flash ROM region (S34).

Preferably, when the program is updated, according to whether normal update has been completed or not, a predetermined status value (normal: 0xAB and error: 0xFF or 0x00) is recorded in a specific memory address (0xFFFE). Booting continues if the normal status value has been recorded by checking the value of the corresponding address when booting (S170). If the error value has been recorded, a mode of the terminal is switched to the forcible download mode (S160).

After the terminal enters the forcible download mode (S161), a level of a particular port (GPIO pin: General Purpose Input and Output pin) of the communication module (e.g., MSM chip) is detected and its status (high level or low level) is checked (S162). Then, it is determined whether the corresponding forcible download function is performed through UART1 (e.g., when the particular port is set to high level) or through UART2 (e.g., when the particular port is set to low level) (S163). Here, the user can select the status of the particular port by mounting a pull up/pull down switch (301 in FIG. 5) on the outside of the terminal.

If the UART2 is selected, the user copies the cabinet file to the PDA through the UART2 by using the program update tool for PDA and can update the binary file of the communication module (S164). However, if the UART1 is selected, the UART1 is connected to the PC via an external interface connector, called LT, and the program update tool for the PC is used so that the binary file can be updated (S165).

Meanwhile, when the terminal does not enter the forcible download mode, it is diverged into a main binary start address (0x10000) (S171). Accordingly, a normal booting sequence is performed (S172). If the user operates the terminal and inputs a command to enter a program download mode to update a program of the communication module (S173), as in the step S163, a value of the particular port of the communication module is detected (S174) and downloading of the program is performed using the PDA module through the UART2 if the value of the particular port (e.g., GPIO port) of the communication module (e.g., MSM chip), which is set by the switch (301 in FIG. 5) is a high level (S175). Downloading of the program is performed using the PDA module through the UART2. In contrast, if the value of the particular port (GPIO port) is a low level, the external interface connect, called LT, is connected between the UART1 port and the PC (Personal Computer) and downloading of the program is performed using the download tool for the PC (S176).

As described, since entering the forcible download mode is determined without key scan by automatically determining a state of program update when the terminal is booted, the present invention can be applied to the PDA integrated terminal being operated by mutual communication between the PDA module and the communication module (CDMA module) which are separately driven.

In addition, the method for forcibly downloading a program in the PDA integrated mobile communications terminal allows for the user to directly select the communication port through which a program is downloaded. The method also performs the downloading according to circumstances when the terminal enters the program forcible download mode because an error occurs and normal booting is not performed while the program for the update is downloaded through at least two communication ports (UART1 and UART2).

Accordingly, since the user of the terminal can directly update a program and download an update program again by booting the terminal again even though difficulties occur during the updating process, the user does not need to visit a service center. Thus, the user is saved valuable time and expense. In addition, a terminal manufacturer can reduce service costs and increase product reliability.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for forcible downloading at a mobile communications terminal, the method comprising:
    dividing a memory of the mobile communications terminal into a boot binary region and a main binary region;
    downloading a binary program to be updated to the memory;
    recording in a particular address of the boot binary region of the memory a value indicating whether or not the downloading of the binary program is successful;
    determining whether to enter a forcible download mode according to whether an error pertaining to the downloading has occurred by checking the value recorded in the particular address of the boot binary region of the memory when booting the mobile communications terminal;
    selecting a communication port of the mobile communications terminal through which the binary program is to be forcibly downloaded when the mobile communications terminal enters the forcible download mode, wherein the communication port is selected by retrieving a value of a particular port of a communication module inside the mobile communications terminal when checking a status of the particular port; and
    forcibly downloading the binary program through the selected communication port when the binary program did not download successfully,
    wherein a first value recorded in the particular address when the binary program is successfully downloaded to the terminal is different from a second value recorded in the particular address when the binary program is not successfully downloaded to the terminal, and
    wherein normal booting is performed if the value recorded in the particular address indicates that the binary program was successfully downloaded.

2. The method of claim 1, wherein the terminal is a personal digital assistant (PDA) having a mobile phone function.

3. The method of claim 1, wherein the boot binary region comprises a function related to a booting sequence.

4. The method of claim 1, wherein the boot binary region comprises:
    an initialization driving algorithm;
    a program related to initialization of RAM and ROM;
    a program related to initialization of a communication port; and
    a function for allowing to set a continuous, particular data Baud rate.

5. The method of claim 1, wherein the boot binary region comprises a corresponding driver for downloading the binary program through the selected communication port for the transmission and reception of data between the communication module and a PDA module.

6. The method of claim 5, wherein the selected communication port is UART2.

7. The method of claim 1, wherein the main binary region comprises functions except for a function related to a booting sequence.

8. The method of claim 1, wherein the terminal enters the download mode if the value recorded in the particular address indicates that the binary program was not successfully downloaded.

9. The method of claim 1, wherein the value of the particular port is determined by a user switch operation.

10. The method of claim 1, wherein in the selecting step, the communication port comprises a communication port for the transmission and reception of data between a PDA module and a communication module.

11. The method of claim 1, wherein the selected communication port comprises a communication port connected to a PC by using an external interface connector such that the binary program may be downloaded.

12. The method of claim 1, wherein after the binary program is downloaded to a PDA module by connecting the terminal to a PC without a separate external interface connector, the binary program is downloaded again through the selected communication port for performing communication between the PDA module and the communication module.

13. A method for forcible downloading at a mobile communications terminal, the method comprising:
    dividing a memory of the mobile communications terminal into a boot binary region and a main binary region and implementing a merge program for merging the boot binary region and the main binary region;
    downloading a predetermined binary program to the mobile communication terminal;
    recording a predetermined value in a particular address of the memory according to whether the downloading is successful; and entering a forcible download mode if the predetermined value recorded in the particular address when the mobile communications terminal is rebooted indicates that the predetermined binary program was incompletely downloaded;

selecting a communication port of the mobile communications terminal by retrieving a value of a particular port of a communication module inside the mobile communications terminal when checking a status of the particular port; and forcibly downloading the predetermined binary program through the selected communication port when the mobile communications terminal enters the forcible download mode, wherein a first predetermined value recorded in the particular address when the binary program is successfully downloaded to the terminal is different from a second predetermined value recorded in the particular address when the binary program is not successfully downloaded to the terminal, and wherein normal booting is performed if the predetermined value recorded in the particular address indicates that the binary program was successfully downloaded.

14. The method of claim 13, wherein the particular address is located in the boot binary region.

15. The method of claim 13, wherein the predetermined value recorded in the particular address is read whenever power is supplied to the terminal and the terminal is booted.

16. A method for forcible downloading at a mobile communication terminal when the mobile communication terminal enters a forcible download mode, the method comprising:

selecting a communication port of the mobile communication terminal by checking a status of a particular port of a communication module when entering the forcible download mode;

downloading an update program to the mobile communication terminal through the selected communication port;

separating a boot program from the update program;

storing the separated boot program in a boot binary region of a memory coupled to the mobile communication terminal; and recording whether the downloading is successful or not in a particular address of the boot binary region, wherein the separated boot program includes a function for allowing a mode of the mobile communication terminal to be switched to the forcible download mode when it is determined that it is difficult to operate the mobile communication terminal because of an incomplete update program update.

17. The method of claim 16, wherein when power is supplied to the terminal, the terminal is booted by the boot program stored in the boot binary region.

18. The method of claim 16, wherein when the terminal is booted, a value in the particular address is read and the terminal enters the forcible download mode in order to download the update program again according to the read value.

19. The method of claim 16, wherein the boot program checks whether the update program is normally updated or not whenever the terminal is booted.

20. A method for forcible downloading at a mobile communications terminal when the mobile communications terminal enters a forcible download mode, the method comprising:

downloading a program to a communication module through a communication port of the mobile communications terminal selected by a user after the program is forcibly downloaded to a PDA module from a PC, wherein the communication port is selected according to a level value of a particular port of the communication module, wherein downloading the program comprises recording a first value in a particular address of a memory of the mobile communications terminal when the program is successfully downloaded to the mobile communications terminal and recording a second value different from the first value in the particular address when the program is not successfully downloaded to the mobile communications terminal, and wherein normal booting is performed if the value recorded in the particular address indicates that the program was successfully downloaded.

21. The method of claim 20, wherein the level value of the particular port is set by a user's manipulation of a switch provided on the terminal.

22. An apparatus for forcible downloading at a mobile communications terminal, the apparatus comprising:

a memory divided into a boot binary region and a main binary region, wherein the boot binary region stores a booting program configured to perform a booting sequence, the boot binary region including a particular address in which information regarding whether a previous update of the booting program has been successful is recorded when the mobile communications terminal is booted; and a switch configured to select a communication port of the mobile communications terminal through which a program is forcibly downloaded when the mobile communications terminal enters a forcible download mode, wherein the communication port is selected by retrieving a value of a particular port of a communication module inside the mobile communications terminal when checking a status of the particular port, wherein the particular address comprises either a first value recorded when the booting program is successfully downloaded to the mobile communications terminal or a second value different from the first value recorded in the particular address when the booting program is not successfully downloaded to the mobile communications terminal, and wherein the booting sequence performs a normal booting if the value recorded in the particular address indicates that the booting program was successfully downloaded.

23. The apparatus of claim 22, wherein the switch is a pull down-pull up switch.

24. The apparatus of claim 22, wherein the switch determines a level value of the particular port of the communication module.

25. The apparatus of claim 22, wherein the particular port is GPIO (General Purpose Input and Output).

* * * * *